United States Patent
Melcher et al.

(10) Patent No.: US 10,466,392 B1
(45) Date of Patent: Nov. 5, 2019

(54) SYSTEMS WITH TEXTURED LIGHT-SCATTERING FILMS

(71) Applicant: Apple Inc., Cupertino, CA (US)

(72) Inventors: Martin Melcher, Mountain View, CA (US); Christopher D. Jones, Los Gatos, CA (US); James R. Wilson, Cupertino, CA (US); Matthew S. Rogers, San Jose, CA (US); Clarisse Mazuir, San Jose, CA (US); Gregory A. Cohoon, Sunnyvale, CA (US); Matthew E. Last, San Jose, CA (US)

(73) Assignee: Apple Inc., Cupertino, CA (US)

( * ) Notice: Subject to any disclaimer, the term of this patent is extended or adjusted under 35 U.S.C. 154(b) by 3 days.

(21) Appl. No.: 15/678,904

(22) Filed: Aug. 16, 2017

Related U.S. Application Data (60) Provisional application No. 62/380,158, filed on Aug. 26, 2016.

(51) Int. Cl.
*G02B 5/02* (2006.01)
*G02B 5/22* (2006.01)
(Continued)

(52) U.S. Cl.
CPC .............. *G02B 5/0221* (2013.01); *B60J 3/06* (2013.01); *B60K 35/00* (2013.01); *G02B 5/0289* (2013.01); *G02B 5/208* (2013.01); *G02B 5/22* (2013.01); *G02B 27/0101* (2013.01); *G02F 1/13439* (2013.01); *G02F 1/133504* (2013.01); *G02F 1/133555* (2013.01); *B60K 2370/334* (2019.05); *B60K 2370/77* (2019.05); *G02B 2027/0118* (2013.01); *G02B 2027/0194* (2013.01)

(58) Field of Classification Search
CPC .............. G02B 27/0101; G02B 5/0221; G02B 5/0289; G02B 5/02; G02B 5/28; G02B 5/22; G02B 2027/0118; G02B 2027/0194; B60J 3/06; B60K 35/00; B60K 2350/2052; B60K 2350/921; G02F 1/133504; G02F 1/133555; G02F 1/13439
USPC ............................................................. 359/599
See application file for complete search history.

(56) References Cited

U.S. PATENT DOCUMENTS

| | | | |
|---|---|---|---|
| 5,245,468 A | * | 9/1993 | Demiryont ........ B32B 17/10036 204/192.27 |
| 7,199,767 B2 | | 4/2007 | Spero |
| | | | (Continued) |

*Primary Examiner* — William R Alexander
(74) *Attorney, Agent, or Firm* — Treyz Law Group, P.C.; G. Victor Treyz; Michael H. Lyons (57) ABSTRACT

A window or other component may have glass layers and an interposed polymer layer in which a textured light-scattering layer with a diffuse reflectivity is embedded. The textured light-scattering layer may have a textured polymer carrier film coated with a partially reflective layer such as a metal layer. The polymer carrier film may be textured to cause gaps to form within the partially reflective layer. The gaps may be patterned to form ohmic heating current paths or other signal paths through the partially reflective layer. The partially reflective layer may also serve as an electrode in a light modulator such as a liquid crystal light modulator or other light modulator. Images may be projected onto the textured light-scattering layer. The light-scattering layer may also help extract light from a light guiding layer adjacent to the partially reflective layer.

20 Claims, 9 Drawing Sheets

(51) Int. Cl.
*G02F 1/1335* (2006.01)
*G02F 1/1343* (2006.01)
*G02B 5/20* (2006.01)
*G02B 27/01* (2006.01)
*B60J 3/06* (2006.01)
*B60K 35/00* (2006.01)

(56) References Cited

U.S. PATENT DOCUMENTS

| | | | | |
|---|---|---|---|---|
| 8,854,736 | B2* | 10/2014 | Yoshida | B32B 7/12 |
| | | | | 359/359 |
| 8,970,949 | B2* | 3/2015 | Suzuki | G02B 5/208 |
| | | | | 359/359 |
| 9,063,287 | B2* | 6/2015 | Nagahama | E06B 9/24 |
| 9,606,272 | B2* | 3/2017 | Sandre-Chardonnal | |
| | | | | B32B 17/10 |
| 9,822,236 | B2* | 11/2017 | Booth, Jr. | C08K 5/11 |
| 9,846,265 | B2* | 12/2017 | Ehrensperger | B32B 17/10018 |
| 10,094,959 | B2* | 10/2018 | Schiavoni | B32B 17/10036 |
| 2003/0016368 | A1 | 1/2003 | Aman et al. | |
| 2003/0054160 | A1 | 3/2003 | Fisher et al. | |
| 2003/0155467 | A1* | 8/2003 | Petrenko | A63C 1/30 |
| | | | | 244/134 R |
| 2003/0161997 | A1 | 8/2003 | Moran | |
| 2004/0130702 | A1 | 7/2004 | Jupp et al. | |
| 2007/0196630 | A1 | 8/2007 | Hayes et al. | |
| 2009/0020215 | A1* | 1/2009 | Hood | B32B 17/10018 |
| | | | | 156/151 |
| 2013/0075383 | A1* | 3/2013 | Kim | H05B 3/84 |
| | | | | 219/203 |
| 2014/0056028 | A1 | 2/2014 | Nichol et al. | |
| 2015/0202846 | A1* | 7/2015 | Byker | C23C 14/086 |
| | | | | 428/141 |
| 2015/0205128 | A1 | 7/2015 | Border | |
| 2016/0282522 | A1* | 9/2016 | Schiavoni | B32B 17/10036 |
| 2016/0325528 | A1* | 11/2016 | Berard | B32B 17/10036 |
| 2017/0235175 | A1* | 8/2017 | Suzuka | G02F 1/29 |
| | | | | 349/33 |
| 2019/0150229 | A1* | 5/2019 | Lau | B32B 17/10 |

* cited by examiner

SYSTEMS WITH TEXTURED LIGHT-SCATTERING FILMS

This application claims the benefit of provisional patent application No. 62/380,158, filed on Aug. 26, 2016, which is hereby incorporated by reference herein in its entirety.

FIELD

This relates generally to light scattering structures, and, more particularly, to systems having light-scattering films.

BACKGROUND

In vehicles, building systems, portable electronic devices, and other systems, it is often desirable to provide structures that modify the propagation of light. For example, windows are sometimes provided with frosted surfaces or mirror coatings to enhance privacy.

It can be challenging to incorporate structures for modifying the propagation of light into windows. If care is not taken, windows may be too reflective, may be insufficiently transparent for viewing, or may have other undesired attributes.

SUMMARY

A system such as a vehicle may include structures with textured light-scattering layers. The structures may include windows, exterior vehicle lighting structures, and other vehicle components. The structures may be used in buildings, vehicles, and other systems.

A window may have glass layers and an interposed polymer layer. The window may have a textured light-scattering layer with a diffuse reflectivity that is embedded within the polymer layer.

The textured light-scattering layer may have a textured polymer carrier film coated with a partially reflective layer. The partially reflective layer may be formed from metal that serves as a one-way mirror and that can block infrared light.

The polymer carrier film may be textured to cause gaps to form within the partially reflective layer. The gaps may be patterned to form ohmic heating current paths or other signal paths through the partially reflective layer.

The partially reflective layer may serve as an electrode in a light modulator such as a liquid crystal light modulator or other light modulator. The light modulator may also have transparent conductive electrodes such as electrodes formed from indium tin oxide.

Images may be projected onto a textured light-scattering layer in a window. The light-scattering layer may also help extract light from a light guiding layer adjacent to the partially reflective layer.

DETAILED DESCRIPTION

A system may have structures formed from one or more layers of glass, polymer, conductive material (e.g., transparent conductive material such as indium tin oxide), crystalline materials (e.g., sapphire), and/or other materials. The structures may include opaque layers and/or transparent layers (e.g., transparent glass and polymer layers, etc.). In some configurations, displays, optical filters, tint layers, light modulators, and other components may be incorporated into the structures.

The structures may include one or more textured light-scattering layers. The textured light-scattering layers may provide the structures with a desired appearance (e.g., an appearance characterized by a diffuse reflectivity and few specular reflections). If desired, the structures may be formed as part of windows in a vehicle, building, or other system, exterior or interior lighting for a vehicle, building, or other system, or as part of other components. Illustrative configurations in which the structures with the textured light-scattering layers are used in windows for a system such as a vehicle or building may sometimes be described herein as an example.

Figure 1:
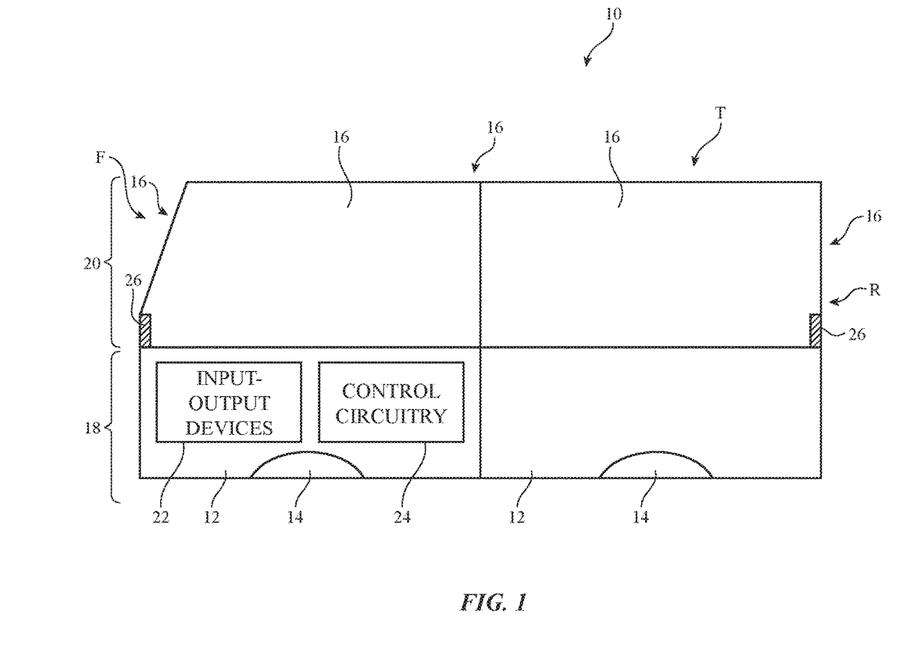
FIG. 1 is a schematic diagram of an illustrative system in accordance with an embodiment.

An illustrative system with windows and other structures that may include one or more textured light-scattering layers is shown in FIG. 1. As shown in FIG. 1, system 10 may be a vehicle having portions such as portions 18 and 20. Portion 18 may include wheels 14, a body such as body 12 with a chassis to which wheels 14 are mounted, propulsion and steering systems, and other vehicle systems. Body 12 may include doors, trunk structures, a hood, side body panels, a roof, and/or other body structures. Seats may be formed in the interior of vehicle 10. Portion 20 may include windows such as window(s) 16. Window 16 and portions of body 12 may separate the interior of vehicle 10 from the exterior environment that is surrounding vehicle 10. Windows 16 may include front windows on front F of vehicle 10, a moon roof window or other window extending over some or all of top T of vehicle 10, rear windows on rear R of vehicle 10, and side windows on the sides of vehicle 10 between front F and rear R. If desired, structures with textured light-scattering layers may be used in forming laminated glass structures and other structures that serve as exterior lighting components (e.g., front and rear lights 26, center high mounted stop lamps, running lights, etc.).

Window 16 may be formed from one or more layers of transparent glass, clear polymer (e.g., polycarbonate), polymer adhesive layers, and/or other layers. In some arrangements, window(s) 16 may include laminated window structures such as one or more layers of glass with interposed polymer layer(s). The polymer in a laminated window may be, for example, a polymer such as polyvinyl butyral (PVB) or ethylene-vinyl acetate (EVA).

Vehicle 10 may include control circuitry 24 and input-output devices 22. Control circuitry 24 may include storage and processing circuitry for supporting the operation of vehicle 10. The storage and processing circuitry may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 24 may be used to control the operation of vehicle 10 and the components in vehicle 10 (e.g., components associated with windows 16, lights 26, input-output devices 22, etc.). For example, processing circuitry can display images on display components associated with windows 16, may turn on and off windows and lights, may adjust the transparency of light modulators in windows 16, lights 26, and/or other input-output devices 22, and/or may make other adjustments to components such as windows 16, lights 26, etc. The processing circuitry may be based on one or more microprocessors, microcontrollers, digital signal processors, baseband processors, power management units, audio chips, application specific integrated circuits, etc.

Input-output devices 22 may allow data to be supplied to vehicle 10 and to a user and may allow data to be provided from vehicle 10 to external systems or a user. Input-output devices 22 may include buttons, scrolling wheels, touch pads, key pads, keyboards, and other user input devices. Microphones may be used to gather voice input from a user and may gather information on ambient sounds. Devices 22 may include ambient light sensors, proximity sensors, magnetic sensors, force sensors, accelerometers, image sensors, and/or other sensors for gathering input. Output may be supplied by devices 22 using audio speakers, tone generators, vibrators, haptic devices, displays, light-emitting diodes and other light sources, and other output components. Devices 22 may include wired and wireless communications circuitry that allows vehicle 10 (e.g., control circuitry 24) to communicate with external equipment and that allows signals to be conveyed between components (circuitry) at different locations in vehicle 10.

Figure 2:
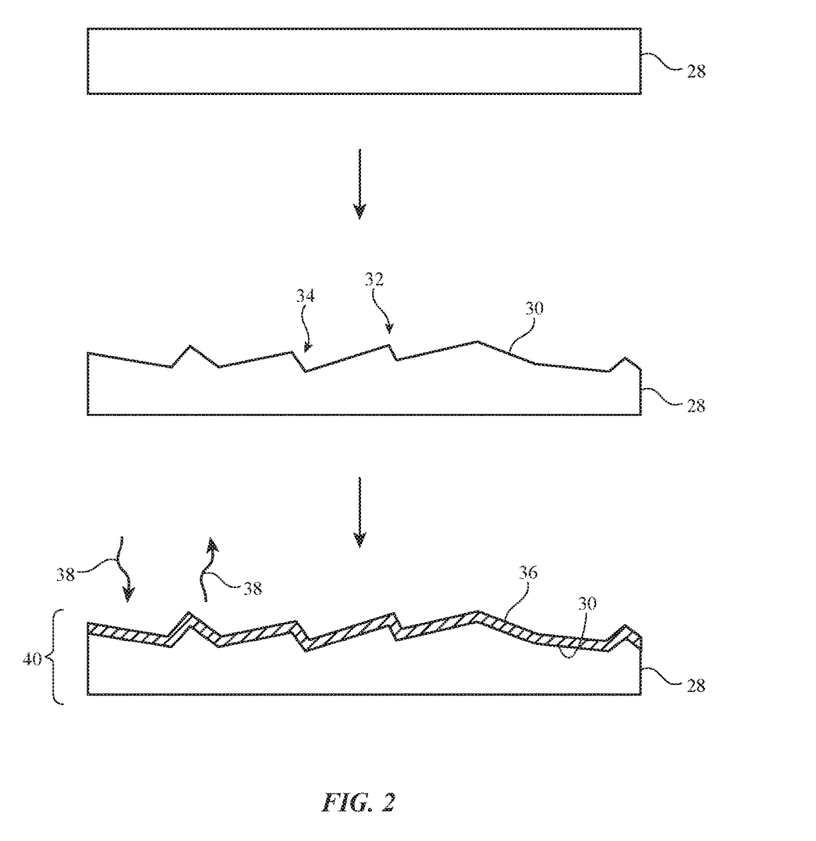
FIG. 2 is a diagram showing how a textured light scattering layer may be formed in accordance with an embodiment.

One or more textured light-scattering layers may be incorporated into windows 16, lights 26, and other components of vehicle 10. Illustrative operations associated with forming a textured light-scattering layer are shown in FIG. 2. As shown in FIG. 2, a layer such as layer 28 (e.g., a polymer layer or other layer) may be processed to provide layer 28 with textured surface 30. Textured surface 30 may be formed by embossing layer 28 with a textured roller, by pressing against surface 30 with a textured plate in a press, or by otherwise applying pressure with a textured tool. Laser processing techniques, chemical processing techniques, and/or other processing techniques may also be used in forming textured surface 30. Textured surface 30 preferably has a pseudorandom distribution of protrusions (peaks) such as protrusion 32 and recesses (valleys) such as recess 34.

Following formation of textured surface 30, a metal coating layer or other reflective coating such as reflective layer 36 may be formed on surface 30 (e.g., by physical vapor deposition or other suitable deposition techniques). Layer 36 preferably has a thickness that is sufficiently thin to preserve the textured nature of textured surface 30 (e.g., coating 36 may be less than 1 micron in thickness, less than 0.2 microns in thickness, less than 0.1 microns in thickness, less than 0.5 microns, more than 0.01 microns, etc.). Layer 36 may be formed from aluminum, silver, other metals, multiple layers of dielectric and/or metal, or other suitable materials that allow layer 36 to form a reflective textured light-scattering layer supported by layer 28. Layers such as layer 36 may be formed on multiple sides of one or more carrier layers such as layer 28. Configurations in which textured light-scattering layer 40 has a single-sided coating 36 on a single carrier layer 28 may sometimes be described herein as an example.

If desired, thin metal films (e.g., silver layers, etc.) or other films (e.g., dielectric and/or metal layers) may be used in forming layer 36 and layer 36 may serve as an infrared light reflecting and/or blocking filter and/or may serve as a partial visible light reflector (e.g., a 50% light visible light reflecting layer for a one-way mirror, a visible light reflecting layer that reflects less than 50% or more than 50%, etc.). Layer 36 may be supported by layer 28 to form textured light-scattering layer 40. Layer 40 may be incorporated into windows 16, lights 26, and/or other components in vehicle 10.

Figure 3:
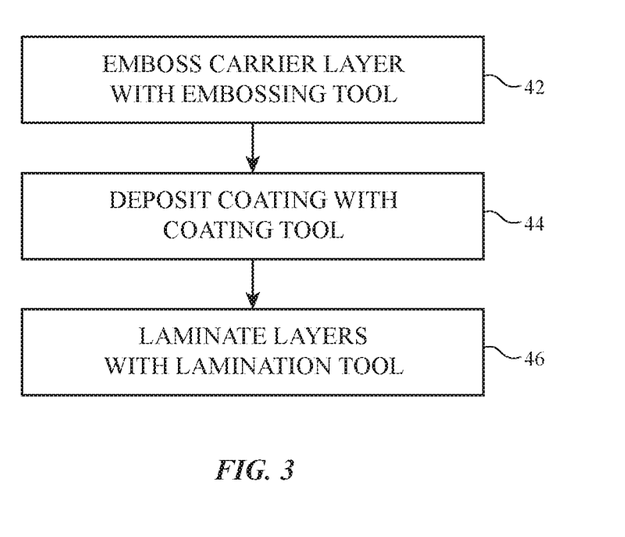
FIG. 3 is a flow chart of illustrative operations involved in forming a window with a light scattering layer in accordance with an embodiment.

FIG. 3 is a flow chart showing illustrative processing operations of the type that may be associated with forming windows 16 or other structures incorporating a textured light-scattering layer such as layer 40.

During the operations of block 42, an embossing tool (e.g., a rotating embossing roller used in a roll-to-roll plastic film processing system, a laser, or other embossing equipment) may be used to form textured surface 30 on layer 28. Layer 28 may be a carrier film formed from a flexible polymer layer such as a layer of polyethylene terephthalate (PET) or other suitable polymer film. The thickness of layer 28 may be more than 10 microns, more than 50 microns, more than 100 microns, less than 200 microns, or other suitable thickness. The peak-to-peak roughness of the surface texture (i.e., the thickness of layer 28 at peaks such as peak 32 of layer 28 of FIG. 2 minus the thickness of layer 28 at valleys such as valley 34 of layer 28 of FIG. 2) may be more than 0.5 microns, more than 2 microns, more than 8 microns, more than 40 microns, may be less than 60 microns, or may have other suitable values. The pseudorandom pattern of the peaks (protrusions) and valleys (recesses) in layer 28 may help prevent undesired gratings from forming and may help minimize interference effects.

During the operations of block 44, a physical deposition tool (e.g., an evaporation tool, a sputtering tool, etc.) or other equipment for depositing one or more layers of material on layer 28 may be used to deposit reflective layer 36, thereby forming textured light-scattering layer 40. Layer 36 may be formed form silver, aluminum, multiple dielectric layers and/or metal layers, or other layer(s) of material so that layer 36 is at least partly reflective to visible and/or infrared light. In some configurations, layer 36 may form an infrared blocking layer (e.g., an infrared blocking filter that blocks 90% or more of incoming infrared light, an infrared blocking layer that has an infrared light transmission of less than 50%, less than 40%, less than 30%, less than 5%, more than 1%, etc.) and may be transparent to visible light (e.g., visible light transmission may be more than 60%, more than 80%, or more than 90%). In other configurations, layer 36 may be more reflective at visible light wavelengths (e.g., layer 36 may reflect more than 50% of visible light, more than 80% of visible light, or more than 90% of visible light). Configurations in which other combinations of infrared light reflection and visible light reflection are provided by layer 36 may also be used.

During the operations of block 46, layer 40 may be laminated with one or more additional layers to form windows 16, lights 26, and/or other components in vehicle 10. For example, layer 40 may be laminated between opposing outer and inner glass layer in a laminated safety glass window. Layer 40 may also be laminated to display layers, light modulator layers, glass substrate layers, filter layers and/or other layers (e.g., to form windows 16, lights 26, and other components in vehicle 10). Lamination operations may involve attaching layers together with adhesive (e.g., PVB, EVA, etc.), may involve application of heat, and/or may involve application of pressure.

Figure 4:
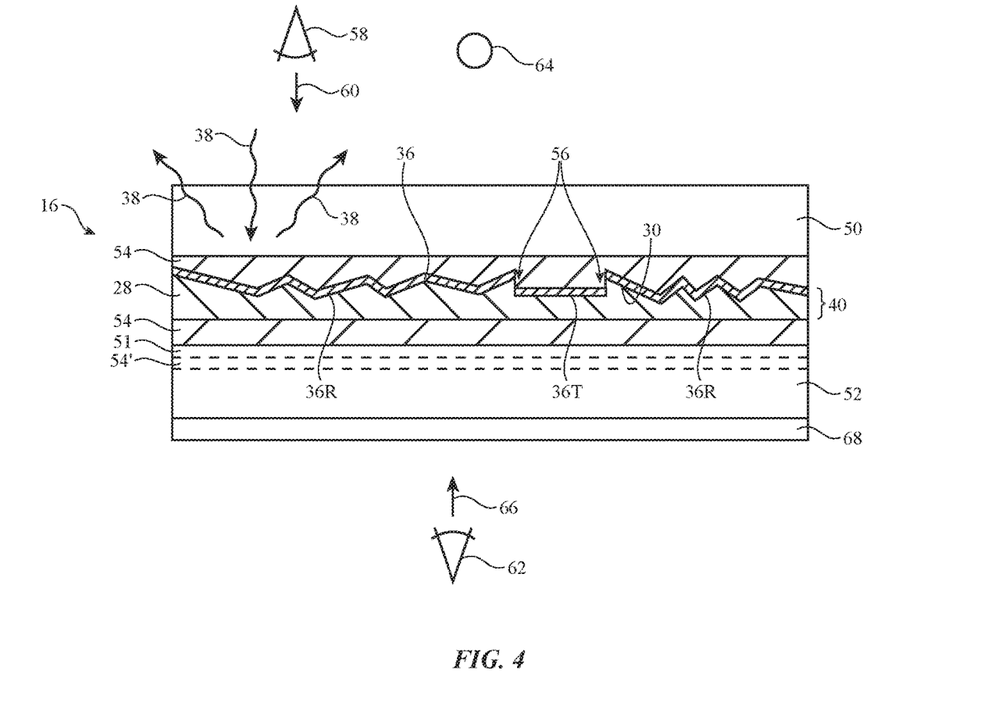
FIG. 4 is a cross-sectional side view of an illustrative laminated window with a textured light scattering layer in accordance with an embodiment.

FIG. 4 is a cross-sectional side view of an illustrative textured layer such as layer 40 that has been incorporated into a window. As shown in FIG. 4, window 16 may include outer window layer 50 and inner window layer 52. Layers 50 and 52 may be formed from glass, plastic, or other suitable window material. Illustrative configurations for window 16 in which window layers such as layer 50 and 52 are formed from glass layers may sometimes be described herein as an example. If desired, window 16 may include additional layers of glass or plastic (i.e., window 16 may be a triple-glass-layer laminate, etc.). Configurations for window 16 that are based on two glass layers such a window 16 of FIG. 4 are merely illustrative.

Textured light-scattering layer 40 may be formed from reflective layer 36 on textured polymer carrier layer 28. Layer 40 may be embedded within polymer layer 54 (e.g., a polymer adhesive layer such as a layer of PVB, a layer of EVA, etc.) and may be sandwiched between sandwiched between outer window layer 50 and inner window layer 52. The overall thickness of layer 54 may be 100-400 microns, more than 150 microns, more than 250 microns, less than 500 microns, or other suitable thickness.

The outer portion of layer 54 (i.e., the layer between layer 36 and outer layer 50) may be clear or tinted (e.g., the outer portion of layer 54 may be clear to enhance the transparency of window 16). The inner portion of layer 54 (i.e., the layer between layer 28 and inner layer 52) may be formed from clear material or a material that absorbs visible light (e.g., a gray tinted polymer or other tinted material). Clear material or visible-light absorbing material may be used in forming carrier layer 28. If desired, visible-light-absorbing material (e.g., gray tint) may also be incorporated into some or all of layer 52 or other glass layers in window 16.

The textured surface of layer 40 helps scatter light 38 that shines on layer 36 of layer 40 from the exterior of window 16. This causes light 38 to reflect diffusely and prevents a viewer such as external viewer 58 who is viewing window 16 in direction 60 from the exterior of vehicle 10 from observing bright specular reflections from window 16, even in direct sunlight or other bright exterior lighting conditions. When viewed from the exterior of vehicle 10, window 16 may therefore present viewer 58 with a diffuse reflectivity and overall soft appearance.

Reflective layer 36 may be formed from one or more layers of aluminum, silver, other metals, or stacks of dielectric and metal layers. These structures may provide layer 36 with a visible light reflection of about 30-70%, more than 20%, less than 80%, or other suitable value. When the exterior of vehicle 10 is bright and the interior of vehicle 10 is dark (e.g., during daylight conditions), the presence of partially reflecting layer 36 may form a one-way mirror on window 16 that provides vehicle occupants with privacy. External viewers will not be able to easily view into the interior of vehicle 10 because a significant fraction of the bright light on the exterior of vehicle 10 will be reflected by layer 36 and will overwhelm the portion of the dim interior light of vehicle 10 that passes through layer 36 and the rest of window 16.

Metal layers such as silver layers or other layers 36 may also help form an infrared light blocking filter in window 16 (e.g., one or more silver layers in layer 40 may block 10% or more, 50% or more, 80% or more, 90% or more, or less than 99% of infrared light from the exterior of vehicle 10).

The presence of clear material in the outer portion of layer 54 may help enhance transmission through window 16 (e.g., so a viewer inside vehicle 10 such as viewer 62 may observe objects such as object 64 that are outside of vehicle 10 when looking through window 16 in direction 66). The presence of visible light absorbing material in layer 28, the inner portion of layer 54, and/or layer 52 may enhance the one-way mirror effect produced by the partial reflection of layer 36. Visible-light-absorbing layers in window 16 (e.g., layer 28, the tinted inner portion of layer 54, and/or layer 52) may have a light transmission of less than 90%, less than 60%, less than 50%, more than 5%, more than 60%, more than 70%, more than 80%, or other suitable light transmission value. This may provide window 16 with an overall visible light transmission of 10-90%, 20-80%, more than 50%, more than 70%, more than 80%, less than 90%, less than 75%, or other suitable value.

If desired, one or more additional layers such as layer 68 may be included in window 16 (e.g., on the outside of window 16, in the middle of window 16, and/or on the inside of window 16 facing the interior of vehicle 10 as shown in FIG. 4). Layers such a layer 68 may include, for example antireflection coating layers. The incorporation of an antireflection layer (e.g., layer 68) on the inner surface of glass layer 52 may help reduce specular interior light reflections off of the interior surface of layer 52 and may help reduce haze for a viewer such as viewer 62 who is viewing external object 64 through window 16. When the exterior of vehicle 10 is dark and interior lighting is on in the interior of vehicle 10, light from the interior lighting has the potential to create undesired light reflections. Antireflection layer 68 and the use of the textured surface of layer 28 in layer 40 to impart texture to layer 36 may help reduce undesired specular reflections of interior light back into the interior of vehicle 10 from layer 36. Tinting in layer 52, the inner portion of layer 54, and/or layer 28 may help reduce hazy reflections of interior light from the inner surface of layer 36 back into the interior of vehicle 10.

An active layer such as active layer 51 may optionally be incorporated between layer 54 and an additional polymer layer such as additional polymer layer 54' on layer 52. Additional polymer layer 54' may be a polymer adhesive layer such as a layer of PVB, a layer of EVA, etc. With this type of arrangement, both layer 51 and layer 40 may be embedded within a polymer layer (PVA, EVA, etc.) between layers 50 and 52.

Active layer 51 may be a light modulator such as a liquid crystal light modulator with polarizers, a guest-host liquid crystal light modulator, a light modulator such as a suspended particle device, an electrochromic light modulator, an adjustable haze layer such as a polymer dispersed liquid crystal device, a cholesteric liquid crystal device, or other light modulating layer. Layer 51 may have a pair of transparent electrodes formed from thin metal, transparent conductive material such as indium tin oxide, or other transparent conductive electrode structures and may have liquid crystal structures, suspended particle device structures, or other active layer structures sandwiched between the electrodes.

If desired, different orders may be used for the layers of window 16 of FIG. 4. For example, the positions of layers 36 and 28 may be reversed, the positions of layers 51 and layer 40 may be reversed, etc.

Textured surface 30 of layer 28 may be provided with vertical or near-vertical structures (i.e., surfaces that extend perpendicularly to the planar surfaces of the layers in window 16). These vertical or near-vertical structures can create gaps 56 in layer 36 when layer 36 is deposited on surface 30 of layer 28. The vertical structures in layer 28 may be formed by using an embossing tool with corresponding vertical-sidewall protrusions and/or recesses to emboss a texture with vertical sidewall structures onto layer 28 or by using other texture-forming equipment to form textured surface 30.

Gaps 56 may be patterned so as to create conductive strips of layer 36 (e.g., conductive lines or other conductive paths such as a path 36T that is running into the page in the orientation of FIG. 4) and other structures that are electrically isolated by gaps 56 from adjacent portions of layer 36 (see, e.g., adjacent portions 36R). By forming an appropriate pattern of gaps 56, layer 36 may therefore be patterned to form signal paths for distributing power, data signals, ohmic heating currents, and/or other signals across window 16.

Figure 5:
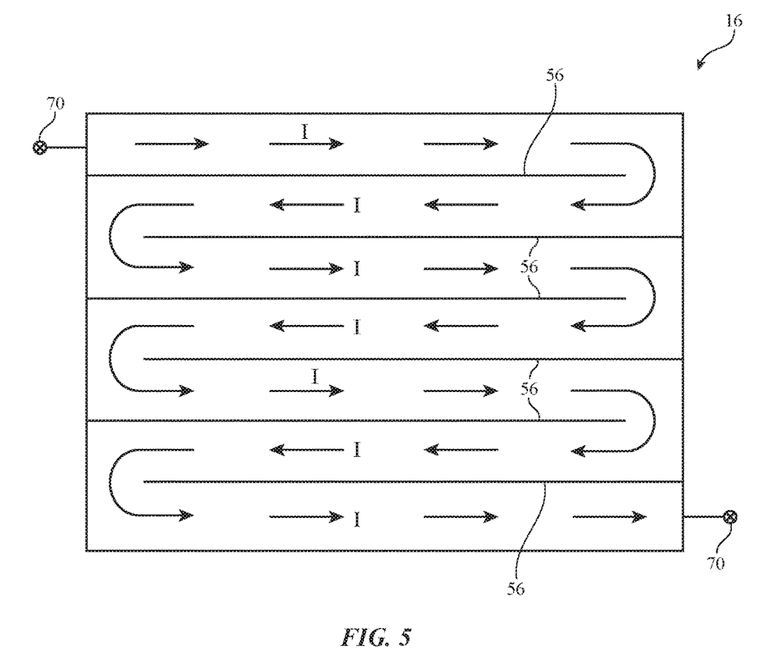
FIG. 5 is a top view of an illustrative window with a patterned conductive layer of the type that may be used to form signal lines for an ohmic heating element or other component in accordance with an embodiment.

If desired, gaps 56 may be used to divide layer 36 into a serpentine path of the type shown in FIG. 5. As shown in the example of FIG. 5, layer 36 may have gaps 56 that cause current I to flow back and forth across window 16. Control circuitry 24 may be used to apply current I to layer 36 via terminals 70 to ohmically heat layer 36 and thereby heat window 16 (e.g., to defrost window 16, etc.).

Figure 6:
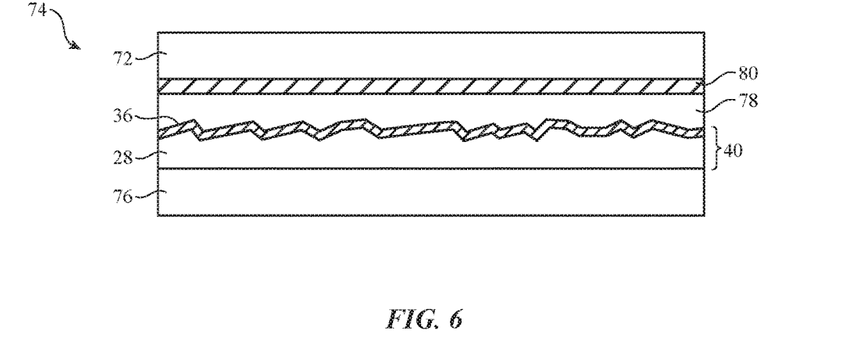
FIG. 6 is a cross-sectional side view of an illustrative light modulator with a textured light-scattering electrode layer that may be incorporated in a window or other component in accordance with an embodiment.

A light-modulator layer may have an electrode or pair of electrodes formed from textured conductive layers such as textured layer 36 of layer 40 and/or other conductive layers. As shown in FIG. 6, light modulator layer 74 may include first and second opposing substrates such as layers 72 and 76. Layers 72 and 76 may be formed from clear glass, transparent plastic, or other suitable substrate materials. Light modulator 74 may include first and second electrodes. First electrode 80 may be formed from a transparent conductive coating such as a layer of indium tin oxide, a layer of metal that is sufficiently thin to be transparent, or other electrode material. Second electrode 80 may be formed from metal layer 36 on textured polymer layer 28 of layer 40. Layer 40 may be attached to layer 76 using a layer of adhesive (as an example). Electrode 80 may be formed as a coating on the inner surface of layer 72. If desired, electrode 80 may be a textured conductive electrode (e.g., an electrode such as electrode 36 on layer 28).

Layer 78 may be a guest-host liquid crystal layer or other suitable light modulation active layer (e.g., a layer of liquid crystal material in a cholesteric liquid crystal light modulator, a layer of electrolyte in an electrochromic light modulator, a layer of polymer-dispersed liquid crystal material in a polymer-dispersed liquid crystal display, or any other suitable light modulator active layer).

Control circuitry 24 may be used to control light transmission through light modulator 74 by applying control signals to layer 78 using electrodes 80 and 36. The use of a textured layer in forming layer 36 (and, if desired, layer 80) may help reduce specular light reflections and thereby enhance the appearance of light modulator 74. If desired, light modulators such as light modulator 74 of FIG. 6 may be incorporated into window 16, lights 26, and/or other components in vehicle 10 (e.g., layers 72 and/or 76 may be glass layers in a laminated glass window such as window 16 of FIG. 4, etc.). One or more of the layers in this type of window may be tinted, as described in connection with FIG. 4.

Figure 7:
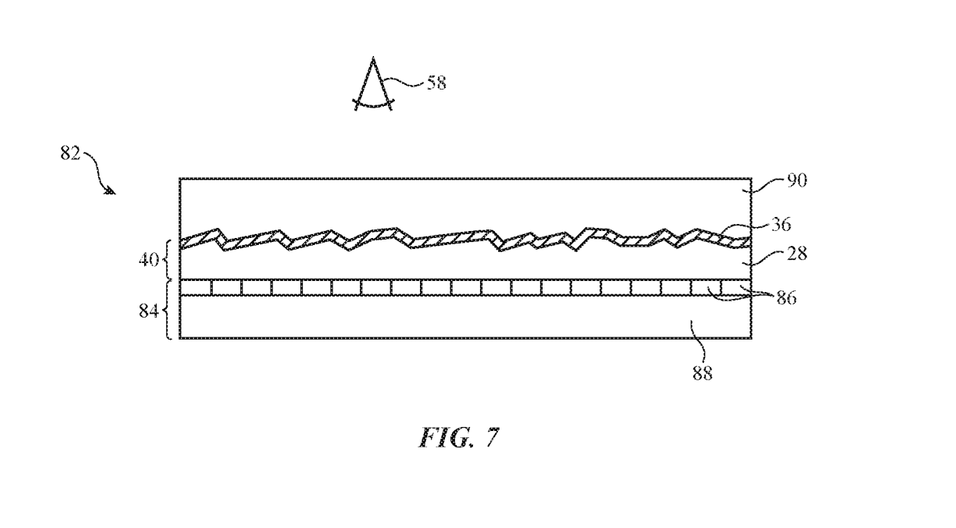
FIG. 7 is a cross-sectional side view of an illustrative laminated structure having a textured light-scattering layer overlapping a display in accordance with an embodiment.

In the illustrative configuration of FIG. 7, textured light-scattering layer 40 has been incorporated into a structure for a window or other component in vehicle 10 (component 82) in which light is emitted by a light-emitting component such as display 84. Display 84 may include one or more substrate layers such as substrate layer 88 and may include thin-film circuitry and/or other structures that form an array of pixels 86 for displaying images (e.g., in response to receiving image data from control circuitry 24). If desired, light-emitting components such as component 84 may contain only one or a few light-emitting elements (e.g., a large light-emitting diode or a small number of large light-emitting diodes, one or a few edge-lit light guide plates, etc.). Configurations in which light-emitting components such as component 84 are displays are merely illustrative.

Textured layer 40 may overlap display 84. When display 84 (or other suitable light-emitting component) is turned on, light (images) from display 84 may pass through layer 40 for viewing by viewer 58. When display 84 is turned off, diffuse reflections of light from layer 40 (e.g., diffuse reflections of exterior light) may hide display 88 from view. The surface of layer 40 may be covered with layer 90 (e.g., a polymer resin and/or one or more additional layers such as antireflection layers, one or more glass window layers, one or more rigid plastic window layers, light-modulator structures (see, e.g., light modulator 74 of FIG. 6), and/or other structures in vehicle 10.

Component 82 may be one of windows 16, may be one of lights 26, or may be any other component in vehicle 10. Display 84 of FIG. 7 (e.g., display substrate 88 and/or other layers in display 84) may be transparent or may be opaque so that viewer 58 cannot view objects through component 82.

Figure 8:
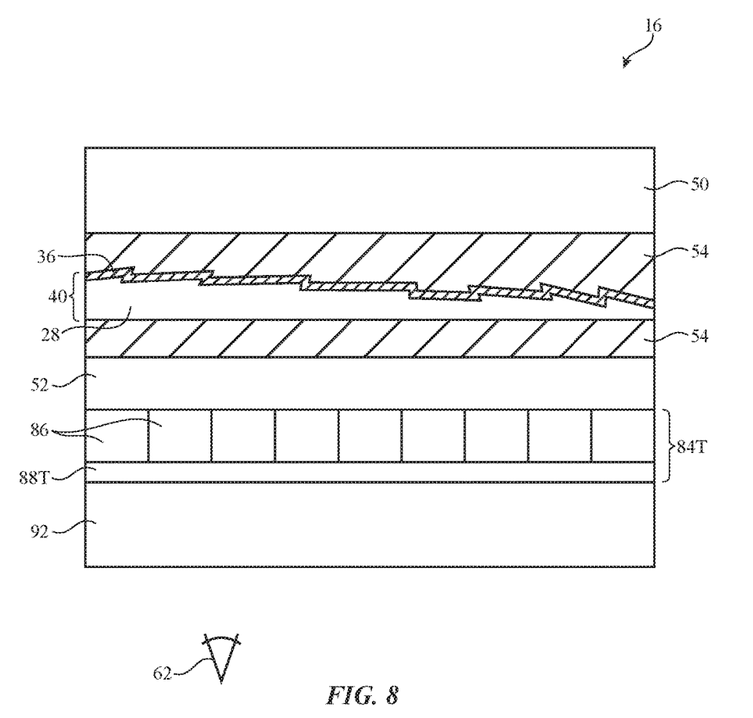
FIG. 8 is a cross-sectional side view of an illustrative laminated structure having a textured light-scattering layer overlapping a transparent display and tint layer in accordance with an embodiment.

As shown in FIG. 8, window 16 may have an adhesive layer such as adhesive layer 54 (e.g., a PVB layer or an EVA layer) that is sandwiched between window layer 50 and window layer 52 (e.g., glass layers or layers of rigid plastic). Textured layer 40 may be embedded within layer 54 between layers 50 and 52. Display 84T may be transparent and may be mounted on the interior surface of layer 52 (e.g., using an adhesive layer, etc.). Display 84T may include an array of pixels 86 and a substrate such as transparent substrate 88T. If desired, display 84T may be a light-emitting component such as a light-emitting diode or small number of light-emitting diodes, may have one or a few light-guide plates, etc. In the example of FIG. 8, display 84T has an array of pixels for displaying images to viewers inside and/or outside of vehicle 10.

Display 84T of FIG. 8 and display 84 of FIG. 7 may be organic light-emitting diode displays, liquid crystal displays, or other suitable displays. As shown in FIG. 8, a layer such as layer 92 may be formed between display 84T and viewer 62 in the interior of vehicle 10. Layer 92 may include visible-light-absorbing material and/or infrared-light-absorbing material. Layer 92 may, for example, be colored with a gray tint or other suitable tint. The light absorption provided by layer 92 may help enhance privacy for occupants of vehicle 10. As with the arrangement of FIG. 7, images on pixel array 86 of display 84T may be visible through layer 40 when display 84T is on. Images on pixel array 86 may or may not be visible through layer 92. When display 84T is off, the presence of textured layer 40 may help hide display 84T from the exterior of vehicle 10 and may provide the exterior of window 16 with a diffuse reflectivity and soft appearance.

In configurations in which layer 40 is visible from the exterior of vehicle 10, portions of layer 40 and/or layers that overlap layer 40 such as the outer portion of layer 54 and/or layer 50 may be tinted to help layer 40 and the other structures of window 16 or other component match the external appearance of vehicle 10. For example, window 16 may be tinted so that the diffuse reflections from layer 40 and the other portions of window 16 are matched in appearance to a paint color associated with a layer of paint on body 12. In this situation, window 16 would be transparent to occupants of vehicle 10 such as viewer 62. At night, when lighting outside of vehicle is low and when interior lighting in vehicle 10 is on, layer 40 will produce soft diffuse reflections of the interior lighting.

Figure 9:
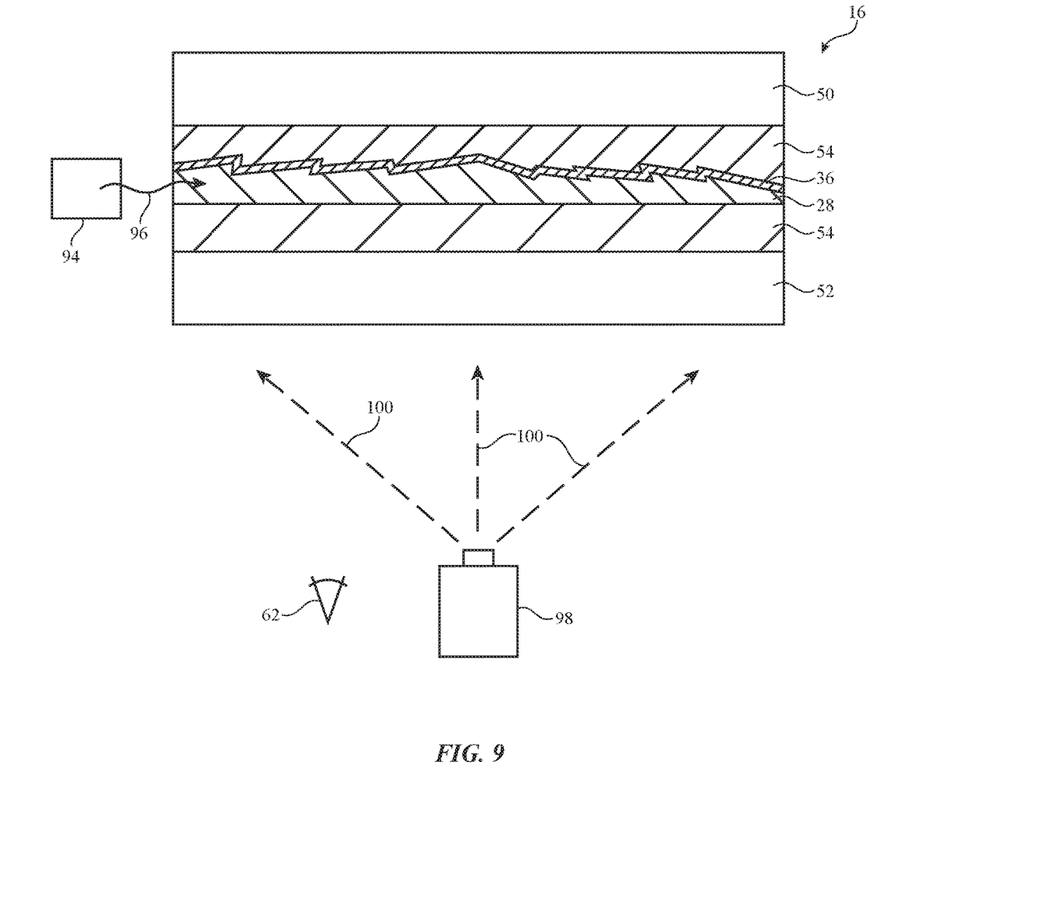
FIG. 9 is a cross-sectional side view of an illustrative window having a textured layer that may serve as a light extraction structure in a light guide so or a projector screen for displaying projected images in accordance with an embodiment.

As shown in FIG. 9, a light source such as light source 94 may emit light 96 into an edge portion of one or more light-guiding layers in window 16 such as layer 28, portions of layer 54, and/or other layers. This light may propagate laterally throughout window 16 in accordance with the principle of total internal reflection (e.g., in a scenario in which layer 28 has a higher refractive index than layer 54 so that light is guided in layer 28 and so that layer 54 serves as a cladding layer, etc.). The texture of layer 40 (e.g., the texture on the inner surface of layer 36 in the example of FIG. 9) may scatter light 96 inwardly to provide interior illumination in vehicle for a vehicle occupant such as viewer 62 (i.e., layer 36 may be textured so that layer 36 serves as a light extraction layer). Light source 94 may contain one or more visible light-emitting diodes.

If desired, a projector such as projector 98 may project light 100 onto textured layer 40 that is visible to viewer 62. Light 100 may, for example, have a pattern that allows light 100 to serve as decorative interior lighting and/or may be an image that contains text, graphics, fixed and/or moving images, etc. (e.g., when projector 98 is an image projector). Images that are projected onto textured layer 40 by projector 98 may be viewed by viewer 62 (i.e., textured layer 40 may serve as a diffusely reflective projector screen that forms a diffuse reflective surface for projector 98).

The foregoing is merely illustrative and various modifications can be made to the described embodiments. The foregoing embodiments may be implemented individually or in any combination.

What is claimed is:

1. A vehicle window, comprising:
   first and second glass layers separated by a polymer layer; and
   a textured light-scattering layer embedded in the polymer layer, wherein the textured light-scattering layer includes a substrate layer with a textured surface and a partially reflective coating on the textured surface, the partially reflective coating on the textured surface has a diffuse reflectivity, the substrate layer of the textured light-scattering layer has a planar surface that opposes the textured surface, a first portion of the polymer layer is interposed between the textured surface and the first glass layer, and a second portion of the polymer layer is interposed between the planar surface and the second glass layer.

2. The vehicle window defined in claim 1 wherein the partially reflective coating comprises a metal layer.

3. The vehicle window defined in claim 2 wherein the textured surface includes vertical sidewalls that create gaps in the metal layer and the gaps pattern the metal layer into a signal path through which current flows to ohmically heat the metal layer.

4. The vehicle window defined in claim 1 further comprising a light modulator layer embedded in the polymer layer.

5. The vehicle window defined in claim 3, wherein the gaps divide the metal layer into a serpentine path.

6. The vehicle window defined in claim 3, wherein the gaps pattern the metal layer into a signal path configured to distribute data signals across the window.

7. The vehicle window defined in claim 1, further comprising an antireflective layer, wherein the second glass layer is interposed between the antireflective layer and the polymer layer.

8. The vehicle window defined in claim 1, wherein the textured light-scattering layer is configured to convey light from a light source in a direction parallel to a lateral surface of the first and second glass layers via total internal reflection.

9. The vehicle window defined in claim 1, wherein the textured surface faces the first glass layer and the planar surface faces the second glass layer.

10. The vehicle window defined in claim 9, further comprising a pixel array configured to emit light into the textured light-scattering layer through the planar surface.

11. The vehicle window defined in claim 1, further comprising a tint layer that absorbs visible light, wherein a portion of the polymer layer forms the tint layer.

12. The vehicle window defined in claim 1, further comprising a tint layer that absorbs visible light, wherein the textured light-scattering layer forms the tint layer.

13. The vehicle window defined in claim 1, further comprising:
    a tint layer that absorbs visible light.

14. A vehicle window, comprising:
    first and second glass layers separated by a polymer layer;
    a textured light-scattering layer embedded in the polymer layer, wherein the textured light-scattering layer includes a substrate layer with a textured surface and a partially reflective coating on the textured surface, the partially reflective coating on the textured surface having a diffuse reflectivity; and
    a light modulator having an active layer interposed between electrodes, wherein the partially reflective coating forms one of the electrodes.

15. The vehicle window defined in claim 14 wherein the active layer comprises a liquid crystal layer and wherein one of the electrodes is formed from a transparent conductive coating layer.

16. The vehicle window defined in claim 14, further comprising:
    a tint layer that absorbs visible light.

17. A vehicle window, comprising:
    first and second glass layers separated by a polymer layer;
    a textured light-scattering layer embedded in the polymer layer, wherein the textured light-scattering layer includes a substrate layer with a textured surface and a partially reflective coating on the textured surface, the partially reflective coating on the textured surface having a diffuse reflectivity; and
    an array of pixels coupled to the second glass layer, wherein the pixels emit light that passes through the partially reflective coating.

18. The vehicle window defined in claim 17, wherein the array of pixels contacts the textured light-scattering layer.

19. The vehicle window defined in claim 17, wherein the second glass layer is interposed between the array of pixels and the polymer layer, the vehicle window further comprises a light absorbing layer coupled to the array of pixels, and the array of pixels is interposed between the light absorbing layer and the second glass layer.

20. The vehicle window defined in claim 17, further comprising:
a tint layer that absorbs visible light.

* * * * *